United States Patent [19]

Sermon

[11] 4,297,331
[45] Oct. 27, 1981

[54] CATALYSIS

[75] Inventor: Paul A. Sermon, Cowley, England

[73] Assignee: Johnson, Matthey & Co., Limited, London, England

[21] Appl. No.: 158,492

[22] Filed: Jun. 11, 1980

Related U.S. Application Data

[63] Continuation of Ser. No. 948,508, Oct. 4, 1978, which is a continuation of Ser. No. 826,831, Aug. 22, 1977, abandoned.

[30] Foreign Application Priority Data

Aug. 24, 1976 [GB] United Kingdom ............... 35202/76

[51] Int. Cl.$^3$ ............................................. B01D 53/36
[52] U.S. Cl. ..................................... 423/239; 423/351
[58] Field of Search ...................... 423/239, 213.2, 351

[56] References Cited

U.S. PATENT DOCUMENTS 4,062,807 12/1977 Suzuki .............................. 423/239 X
4,073,866 2/1978 Yamaki et al. .................. 423/239 X
4,143,120 3/1979 Sermon .............................. 423/239

OTHER PUBLICATIONS

Hightower, J. W. et al.; *The Cat. Chem. of Nitrogen Oxides;* Plenum Press, N.Y., 1975, pp. 63–93.

*Primary Examiner*—G. O. Peters
*Attorney, Agent, or Firm*—Cushman, Darby & Cushman

[57] ABSTRACT

This invention relates to catalysts and more particularly to the catalyst decomposition of one or more oxides of nitrogen present in a gas stream by contacting the gas with a catalyst comprising a compound of the formula $A_xB_y$, where A is selected from the group consisting of Ti, Zr, Hf, V, Nb, Ta, Cr, Mo, W, Th, and U, B is selected from the group consisting of B, C, N and Si, x has a value $1 \leq x \leq 7$ and y has a value $1 \leq y \leq 4$.

7 Claims, No Drawings

CATALYSIS

This is a continuation of application Ser. No. 948,508, filed Oct. 4, 1978, which is a continuation of Ser. No. 826,831, filed Aug. 22, 1977, now abandoned.

This invention relates to catalysis. More particularly, it relates to the catalytic decomposition of one or more oxides of nitrogen, especially when there is also present a stoichiometric excess of oxygen or oxidation species.

According to the invention, a method for the decomposition of one or more oxides of nitrogen present in a gas stream comprises contacting the gas with a catalyst comprising a compound of formula $A_xB_y$, where A is selected from the group consisting of Ti, Zr, Hf, V, Nb, Ta, Cr, Mo, W, Th and U, B is selected from the group consisting of B, C, N and Si, x has a value $1 \leq x \leq 7$ and y has a value $1 \leq y \leq 4$.

Typical compounds useful as catalysts according to the invention are as follows:

(i) borides of titanium ($TiB_2$), zirconium ($ZrB_2$), molybdenum (MoB) and tungsten (WB);

(ii) carbides of titanium (TiC), silicon (SiC), niobium (NbC), molybdenum ($Mo_2C$) and tungsten ($W_2C$);

(iii) mitrides of titanium (TiN), tantalum ($Ta_2N$), boron (BN) and tungsten ($WN_2$) and (iv) silicides of molybdenum ($MoSi_2$) and tungsten ($WSi_2$).

The compounds may be used as catalysts either in the supported or the unsupported form. If they are used in the supported form, any of the materials known as catalyst supports may be used, for example an inert unitary ports refractory ceramic honeycomb. Alternative supports are, for example, pellets, granules, spherules, powder shaped extrudates, monoliths, corrugated metallic substrates and nichome wire.

Suitable materials which may be used to constitute a ceramic support are zircon-mullite, mullite, alpha alumina, sillimanite, magnesium silicates, kaolin clays, zircon, petalite, spodumene, cordierite and most alumorosilicates.

Proprietary products which may be used are described in U.S. Pat. Nos. 3,397,154 and 3,498,927 and British Pat. No. 882,484. Examples of such products are "TORVEX", a mullite honeycomb having eight corrugations per inch and an alumina washcoat; "THERMACOMB", a cordierite honeycomb supplied by the American Lava Corporation and EX 20, a cordierite honeycomb supplied by Corning Glass.

A surface area of at least 600 sq. ft. per cubic foot of washcoated (as hereinafter defined) honeycomb is preferred. At least 10% of the micropores should have a diameter greater than 10 microns and 90% greater than 10 microns is prefered Suitable corrugated or extended metallic subtrates which may be used are those disclosed in our co-pending British Patent Application No. 49501/73 dated 24th Oct. 1973 and German DOS No. 2,450,664.

One particular extended metal substrate suitable for use with a catalyst of the present invention is an oxidation resistant alloy of iron including at least one of the elements (3-40 wt.%) chromium, (1-10 wt.%) aluminium, (a trace to 5 wt.%) cobalt, (a trace to 72 wt.%) nickel and (a trace to 0.5 wt.%) carbon.

Another extended metal substrate is a heat resisting alloy having an aggregate nickel plus chromium content of greater than 20% by weight, the said heat resisting alloy also exhibiting relatively high mechanical strength and thermal conductivity.

The substrate may be deposited thereon, as a first coating, a "washcoat" or a layer of a high serface area catalytically active refractory metal oxide which is in turn impregnated or coated with the catalyst material according to the invention.

Preferably, the first refractory metal oxide coating upon the substrate is an adherent oxide coating or film containing, for example, one or more of alumina, silica, titania, zirconia, hafnia, thoria, beryllia, magnesia, chromia, or boria but may also comprise oxygen containing anions such as chromate, phosphate, silicate, and nitrate.

The layer comprising the compound useful as a catalyst according to the invention is deposited upon the uncoated or washcoated substrate and may be deposited in a form which possesses catalytic activity or which is capable of being rendered catalytically active by subsequent treatment. Catalytic structures according to this aspect of the present invention are extremely robust and effective in catalysing high temperature reactions such as the decomposition or reduction of nitric acid.

Various compounds suitable for use as catalysts in accordance with the invention will now be described with reference to the following examples:

EXAMPLE 1

Titanium nitride, A sample of this compound, prepared in the laboratory by heating 0.49 g of titanium in NO at 550° C., was tested for NO removal in a gas stream containing 1000 ppm NO in $N_2$ passed through a bed depth of 0.5 cm. The flow rate was 100 cm$^3$min$^{-1}$ which gave an operating space velocity of 45,000 h$^{-1}$. Maximum NO decomposition was about 57% at 550° C. under isothermal conditions. Small doses of air (approx. 2,000,000 ppm $O_2$) did not poison the catalyst. A similar experiment using 0.28 g of commercially-available titanium nitride (British Titan Products) gave a similar pattern of results; maximum NO decomposition was about 45% at 570° C. and again there was little deleterious effect on adding doses of air to the gas stream.

EXAMPLE 2

Tungsten carbide, 0.6 g of tungsten carbide, tested at 800° C. in a gas stream containing 1000 ppm NO in $N_2$ flowing at 80 ml.min$^{-1}$ gave 52% decomposition of NO initially, increasing to 58% after about 4½ hours. About 20,000 ppm oxygen, added continuously, gave a rapid increase in NO decomposition, peaking at about 80% and then falling off to stabilize at 68%.

Using only 0.4g of similar catalyst at 800° C. in a gas stream containing 4000 ppm NO in $N_2$ at 80 ml.min$^{-1}$, activity increased slowly to 84% NO decomposition. Although thane(added continuously at 55 ppm) had no poisoning effect oxygen (20,000 ppm) did reduce the catalytic activity. However, using a greater weight (2.3g) of similar catalyst at only 600° C., the addition of oxygen had a beneficial effect on nitric oxide decomposition.

EXAMPLE 3

Molybdenum carbide. 1 g of molybdenum carbide (Murex Ltd) at 550° C. in a gas stream containing 1000 ppm NO in $N_2$ at a flow-rate of 100 ml.min$^{-1}$ through a bed depth od 1 cm., giving an operating space velocity of 22,500h$^{-1}$, gave about 70% NO decomposition initially, falling off to about 50% in about 2 hours. Doses of air (2000,000 ppm $O_2$) had a deleterious effect for the duration of the dose, and continuous addition of 20,000 ppm $O_2$ had a more serious effect from which the catalyst only partially recovered. NO decomposition had fallen to about 25% after two such continuous additions, each lasting about 20 minutes. Doses of CO (1,000,000 ppm) and $C_2H_4$ (1000 ppm) had no significant effect on NO decomposition.

EXAMPLE 4

Niobium carbide, 1 g of niobium carbide (Murex Ltd) was tested under conditions similar to those for molybdeneum carbide. Decomposition of NO reached a maximum at 500° C. of about 38% after about an hour, after which the activity fell off. Continuous addition of oxygen had no effect on decomposition.

EXAMPLE 5

Tungsten monoboride. 21 g of tungsten boride was tested in a gas stream containing 1,000 ppm NO in $N_2$ flowing at a rate of 100 ml.min $^{-1}$ through a bed depth of 1 cm.; operating space velocity was 20,000h$^{-1}$. At 150° C. there was a decomposition peak of about 65% and a further peak at 475° C. of about 57%. Under isothermal conditions at 500° C., an initial peak of about 57% was followed by a gradual recession to about 30%. A 2 ml dose of air containing about 200,000 ppm $O_2$ caused a fast recession followed by a recovery to about 38% and a further 4 ml dose of air caused a recovery preceeded by a quick recession, to about 40%. Continuous addition of 20,000 ppm $O_2$ caused a rapid increase in activity peaking at about 85% NO decomposition.

EXAMPLE 6

Tungsten silicide. 2.9 g tungsten silicide, $WSi_2$ (Koch Light Laboratories) was tested by passing 1000 ppm No in $N_2$ through a bed depth of 1.4 cm at a rate of 100 ml. min$^{-1}$. At 560° C. under isothermal conditions, a peak of about 60% NO decomposition was followed by a gradual recession to a constant 30% activity. Addition of oxygen had no effect.

What we claim is:

1. A method for the decomposition of NO present in a gas stream which comprises contacting the gas with a catalyst consisting essentially of a compound selected from the group consisting of $TiB_2$, $ZrB_2$, MoB, WB, $Ta_2N$, BN, $MoSi_2$ and $WSi_2$.

2. A method according to claim 1 wherein the catalyst is supported on a carrier made from a ceramic or metallic material.

3. A method according to claim 2 wherein the carrier is in the form of pellets, granules, spherules, powders, wire mesh, monoliths or corrugated metallic substrates.

4. A method according to claim 3 wherein the monolith is made from a ceramic material selected from zirconmullite, alpha alumina, sillimanite, magnesium silicates, kaolin clays, zircon, petalite, spodumene, cordierite and most alumino-silicates.

5. A method according to claim 3 wherein the monolith is in the form of a honeycomb.

6. A method according to claim 5 including a layer of high surface area catalytically active refractory metal oxide applied to the carrier prior to application thereto of the catalyst compound.

7. A method according to claim 6 wherein the said refractory metal oxide is selected from the group consisting of alumina, silica, titania, zirconia, hafnia, thoria, beryllia, magnesia, chromia, or boria but may also comprise oxygen containing anions such as chromate, phosphate, silicate and nitrate.

* * * * *